Sept. 11, 1928.
R. D. EVANS
1,684,056
ELECTRICAL MEASURING INSTRUMENT
Filed Sept. 10, 1924
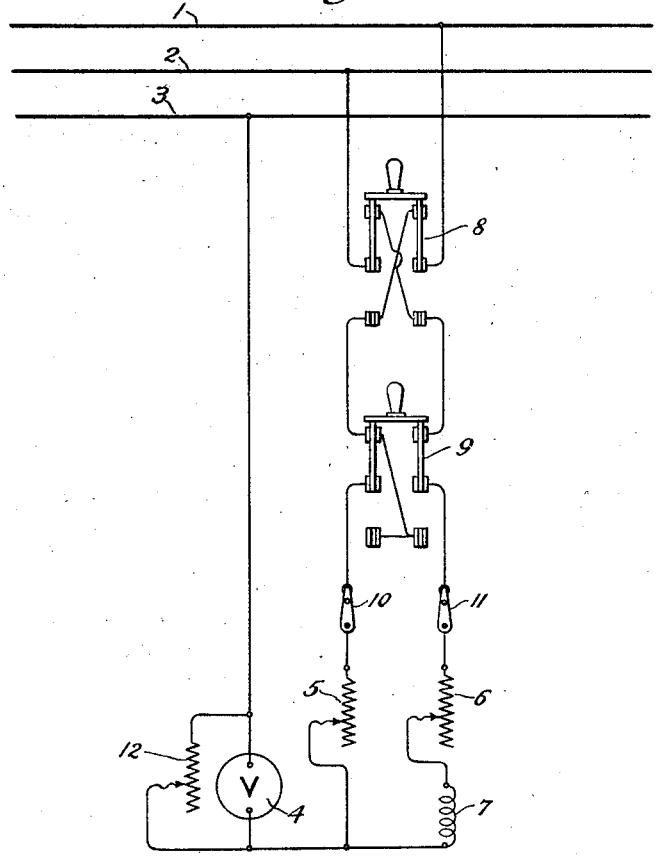
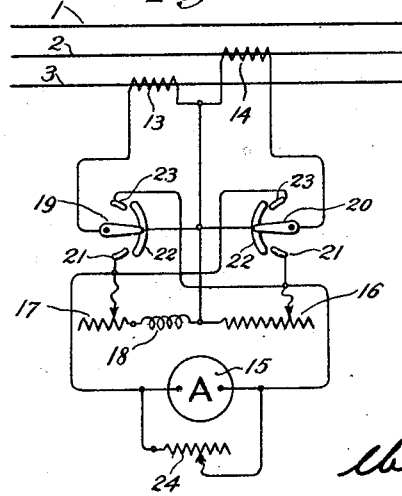
WITNESSES:
INVENTOR
Robert D. Evans
BY
ATTORNEY Patented Sept. 11, 1928.

1,684,056

UNITED STATES PATENT OFFICE.

ROBERT DAVID EVANS, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed September 10, 1924. Serial No. 736,842.

My invention relates to electrical measuring instruments and particularly to instruments having improved means for measuring either the positive or the negative-sequence component of a polyphase quantity, such as current or voltage.

One object of my invention is to provide an instrument of the above-mentioned character in which the accuracy of the indications thereof may be readily checked.

Another object of my invention is to provide an electrical instrument having a winding of definite impedance and means for checking the value of the impedance of this winding.

In practicing my invention, I provide means, such, for example, as a static network similar to that disclosed in my prior Patent No. 1,535,587, dated April 28th, 1925, for segregating the positive and negative-sequence components of current, voltage or power in a polyphase circuit. An electro-responsive device is connected in series with the conductors of the network and circuit-closing devices are provided for altering the connections of the network in such a manner that the accuracy of the instrument may be checked whenever it is desired.

In the accompanying drawings,

Figure 1 is a diagrammatic view of an instrument embodying my invention for obtaining either the positive or the negative-sequence component of voltage; and Fig. 2 is a similar view of an instrument for indicating either the positive or the negative-sequence component of current.

Referring to Fig. 1, 1, 2, and 3 are the conductors of a three-phase circuit connecting a generator to a load (not shown). The generator may produce an unbalanced voltage or the load may cause an unbalanced current to traverse the circuit. The modification of my invention shown in this figure is responsive to the unbalanced voltage condition. An electro-responsive device 4 is connected to the three-phase circuit. A static network comprising variable resistors 5 and 6 and a reactor 7 is associated with the electro-responsive device 4. The variable resistor 5 is connected between the device 4 and one of the conductors of the circuit.

The variable resistor 6 and the reactor 7 are connected between the device 4 and another of the conductors of the circuit. A reversing switch 8 is adapted to reverse the connections of the conductors 1 and 2 to the static network comprising the impedances 5, 6 and 7. Other circuit-closing devices 9, 10 and 11 are provided for the purpose of further altering the connection of the impedances 5, 6 and 7, to the electro-responsive device 4 and the circuit. An adjustable resistor 12 shunts the electro-responsive device 4 in order to change the ratio thereof in order that the deflection of the instrument will correspond to the actual voltages existing on the conductors 1, 2 and 3.

The current through the resistor 5 is substantially in phase with the applied voltage, whereas the current through the resistor 6 and the reactor 7 lags 60° behind the applied voltage. As set forth in my prior patent referred to above, on account of the relative impedances of the branches of the network between the electro-responsive device 4 and the circuit, the electro-responsive device is actuated in accordance with either the positive or the negative-sequence component of voltage depending upon the position of the switch 8 and the phase-rotation of the conductors 1, 2 and 3. The negative-sequence component of voltage provides an indication of the degree of unbalance of the circuit.

In order to function properly, the ratio of the impedances connected to the conductors 1 and 2 must have a certain value. Since the reactance of the reactor 7 varies with changes of frequency, I have provided means for checking the ratio of the impedances connected to the electro-responsive device 4. When it is desired to check the accuracy of the meter, the switch 9 is actuated to a position opposite to that shown and the deflection of the instrument 4 is noted. Then while the load on the circuit is maintained constant, the switches 10 and 11 are alternately opened and the readings of the instrument 4 again noted.

If the relative impedances of the two branches of the network have the proper relation, the last two readings are equal and the first reading is $\sqrt{3}$ times either of the latter readings. If the readings do not have this relation, the resistors 5 and 6 may be adjusted until the proper ratio is obtained and the instrument 4 gives accurate indications of the symmetrical components of voltage. If the deflection of the instrument 4 does not agree with the scale of said instrument, the resistor 12 may be adjusted until the proper calibration is obtained.

The theory of operation is as follows:

For an understanding of the following mathematical equations and their meaning, reference may be had to a paper on the "Theory of symmetrical coordinates" in the Journal of the American Institute of Electrical Engineers by C. LeG. Fortescue, published in 1918.

Assuming an unbalanced three-phase circuit, we may represent the voltages between conductors 1, 2 and 3 as $E_a$, $E_b$ and $E_c$.

Let $E_0$, $E_1$, and $E_2$ represent the symmetrical voltage components of zero, positive and negative phase-sequence respectively.

Then $E_a = E_0 + E_1 + E_2$
and $E_b = E_0 + a^2 E_1 + a E_2$
and $E_c = E_0 + a E_1 + a^2 E_2$ Therefore, $E_0 = \frac{1}{3}(E_a + E_b + E_c)$ and $E_1 = \frac{1}{3}(E_a + a E_b + a^2 E_c)$ and $E_2 = \frac{1}{3}(E_a + a^2 E_b + a E_c)$ Since $E_a$, $E_b$ and $E_c$ form a closed triangle of vectors, $E_a + E_b + E_c = 0$ Therefore, $E_0 = 0$ and $$E_1 = \frac{1}{3}\left[(1 - a^2)E_a + (a - a^2)E_b\right]$$
$$= \frac{\sqrt{3}\epsilon^{j90°}}{3}(\epsilon^{j60°}E_a + E_b) \quad (1)$$

The instrument 4 is actuated in accordance with the current traversing its windings.

Therefore, if the impedance connected in the branches of the network are of such magnitude and character that the scalar value of the impedance in one branch is equal to that in the other branch, the current in one branch resulting from $E_b$ and the current in the other branch resulting from $E_a$ lags 60° behind $E_a$, the deflection of the meter, if connected in series with both branches of the network as shown, is proportional to $E_1$, the positive phase-sequence component.

The relation of the impedances in the network may be checked by the switches 9, 10 and 11 as described. We may represent the resistance of the resistor 5 by $R$, the resistance of the resistor 6 by $r$ and the reactance of the reactor 7 by $x$.

Since the meter reading is the same with the resistor 5 connected in circuit as with the resistor 6 and the reactor 7 in circuit, the absolute values of $R$ and the complex quantity $r + jx$ are equal.

But according to equation (1), the values of the resistor 6 and the reactor 7 should also be such as to produce a phase displacement of 60° between $E_a$ and the current through said resistor and said reactor.

Therefore, the total current through the two branches of the network, if connected in parallel, should be $\sqrt{3}$ times the current through either branch. This relation is checked by the switches 9, 10 and 11.

The negative phase-sequence component $$E_2 = \frac{1}{3}\left[(1-a)E_a + (a^2 - a)E_b\right]$$
$$= \frac{1}{3}\left[\sqrt{3}\epsilon^{-j30°}E_a + \sqrt{3}\epsilon^{-j90°}E_b\right]$$
$$= \frac{\sqrt{3}}{3}\epsilon^{-j30°}(E_a + \epsilon^{-j60°}E_b) \quad (2)$$

By comparing equation (2) with equation (1), it becomes apparent that the reversal of the connection of the impedances 5, 6 and 7 causes a current to traverse the meter that is proportional to the negative instead of the positive phase-sequence component.

In Fig. 2, I have shown a modification of my invention for obtaining the positive or the negative phase-sequence components of current.

Two series or current transformers 13 and 14 are connected in series with the conductors 2 and 3 of the circuit. An instrument 15 is connected to the current transformers 13 and 14 through a static network comprising variable resistors 16 and 17 and a reactor 18 for the purpose of segregating the symmetrical components of current.

Two circuit-closing devices 19 and 20 are connected between the transformers 13 and 14 and the network. The circuit-closing devices 19 and 20 each comprises three contact segments 21, 22 and 23. When the circuit-closing devices 19 and 20 are adjusted to complete a circuit from the current transformers through the segments 21, the electro-responsive device 15 is actuated in accordance with the positive phase-sequence component of current, assuming that the phase-rotation in the three-phase circuit is in the proper direction. When the circuit-closing devices 19 and 20 are adjusted to complete a circuit through the segments 23, the electro-responsive device 15 is actuated in accordance with the negative-phase-sequence component of current. The intermediate segments 22 short-circuit the current transformers 13 and 14 while the switches 19 and 20 are being operated from one extreme position to the other.

In order to check the ratio of the impedances in the two branches of the static network, the switch 19 is actuated to close a circuit through a segment 21 and the switch 20 is actuated to close a circuit through the segment 22. The reading of the instrument 15 is noted and, while the load on the circuit is kept constant, the switch 19 is moved into engagement with segment 23 and the reading again noted. Then, the circuit-closing devices 19 and 20 are both actuated to close circuits through the contacts 21 and a third reading taken. If the impedances 16, 17 and 18 have a proper relation, the first two readings are equal and the third reading is $\sqrt{3}$ times either of the first readings. This result may be proven mathematically in a manner similar to that given above in connection with Fig. 1. If desired, a shunt resistor 24 may be employed in connection with the instrument 15 in order to correct the ratio thereof.

While I have shown and described my invention in connection with an unbalanced three-phase circuit it is not so limited but may be employed in connection with any polyphase circuit. If desired, the external impedances 5, 6 and 7 and the circuit-closing devices employed in connection with the elecro-responsive element of the meter may be combined in a single unitary structure adapted for portable use. I consider that my invention is particularly applicable to such use because of the ease with which the accuracy of the meter may be checked when it is used under varying conditions.

I claim as my invention:

1. An instrument comprising an electro-responsive device, a plurality of impedances associated therewith, and means including a switch for so altering the connection of said impedances to said device that the operation of said device indicates the ratios of said impedances.

2. An instrument comprising an electro-responsive device, means including a plurality of impedances for actuating said device in accordance with a negative-sequence component of an unbalanced polyphase quantity and means including said device for checking the ratios of said impedances.

3. An instrument comprising an electro-responsive element, reactive and resistive windings connected thereto having a constant impedance ratio, and means including a switch for checking the ratio of said windings by comparing the readings of said electro-responsive element under different conditions.

4. In combination with a polyphase circuit, an electro-responsive device connected to the circuit, impedances in the circuit connections that are so proportioned that said device is actuated in accordance with a symmetrical component of a quantity of said circuit and circuit-closing devices for altering the connections of said impedances to check the proportionality thereof by the indications of said device.

In testimony whereof, I have hereunto subscribed my name this 4th day of September, 1924.

ROBERT D. EVANS.